US012767670B2

(12) United States Patent

Martin et al.

(10) Patent No.: US 12,767,670 B2
(45) Date of Patent: Oct. 20, 2026

(54) METHOD FOR THE SYNTHESIS OF TRIS(ORTHO-CARBORANYL)BORANE

(71) Applicant: BAYLOR UNIVERSITY, Waco, TX (US)

(72) Inventors: Caleb Martin, Waco, TX (US); Manjur Oyasim Akram, Waco, TX (US)

(73) Assignee: BAYLOR UNIVERSITY, Waco, TX (US)

( * ) Notice: Subject to any disclaimer, the term of this patent is extended or adjusted under 35 U.S.C. 154(b) by 614 days.

(21) Appl. No.: 18/222,191

(22) Filed: Jul. 14, 2023

(65) Prior Publication Data

US 2024/0018167 A1 Jan. 18, 2024

Related U.S. Application Data

(60) Provisional application No. 63/390,126, filed on Jul. 18, 2022.

(51) Int. Cl.

| | |
|---|---|
| ***C07F 5/02*** | (2006.01) |
| ***B01J 37/02*** | (2006.01) |
| ***B01J 37/06*** | (2006.01) |

(52) U.S. Cl.

CPC .......... *C07F 5/027* (2013.01); *B01J 37/0236* (2013.01); *B01J 37/06* (2013.01)

(58) Field of Classification Search

CPC .................................. C07F 5/027; C07F 5/02

See application file for complete search history.

(56) References Cited

U.S. PATENT DOCUMENTS

2014/0332792 A1* 11/2014 Tada ........................ C07F 5/02 546/13

FOREIGN PATENT DOCUMENTS

EP 2793280 10/2014

OTHER PUBLICATIONS

Lee, et al. "A highly Lewis acidic triarylborane bearing peripheral o-carborane cages." Dalton Transactions 40.44 (2011): 11758-11764 (Year: 2011).*

Notification of Transmittal of the International Search Report and the Written Opinion of the International Search Authority—The European Patent Office—mailed Nov. 13, 2023, for PCT/US23/27910, 11 pages.

Godoy, et al., "Toward Chemical Propulsion: Synthesis of ROMP-Propelled Nanocars", American Chemical Society, vol. 5, No. 1, Dec. 16, 2010, pp. 85-90.

* cited by examiner

*Primary Examiner* — Anthony J Zimmer
*Assistant Examiner* — Eric Scott Sherman
(74) *Attorney, Agent, or Firm* — Jackson Walker LLP

(57) ABSTRACT

The described process synthesizes a halide-free single-site borane compound product tris(ortho-carboranyl)borane, or $BoCb_3$. $BoCb_3$ has Lewis superacid properties. The compounds, $BoCb_3$, are thermally stable, and not reactive towards oxygen, but are sensitive to water. The characteristic high fluoride ion affinity is further translated to the catalytic C—F bond activation reactions of the unactivated alkyl fluorides towards the reduction and C—C bond forming reactions with silanes, and Fridel-Crafts type reactions with arenes. The potential of the synthesized Lewis acid as a catalysis is anticipated.

15 Claims, 5 Drawing Sheets

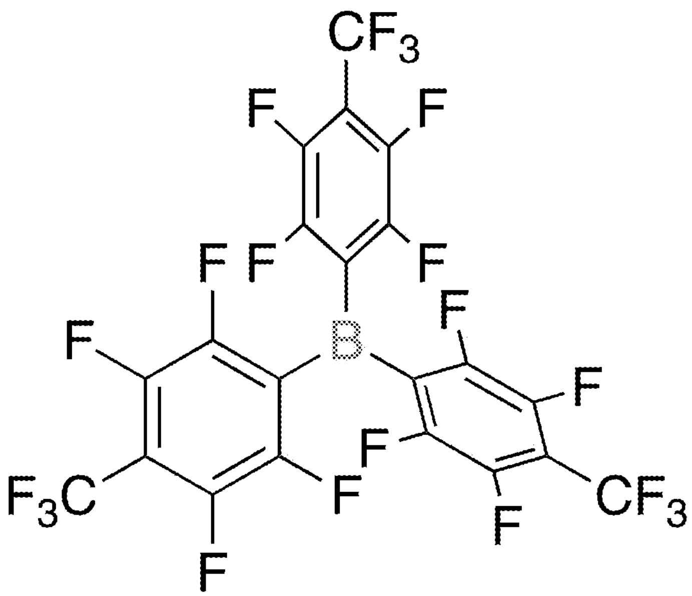
FIG. 2c
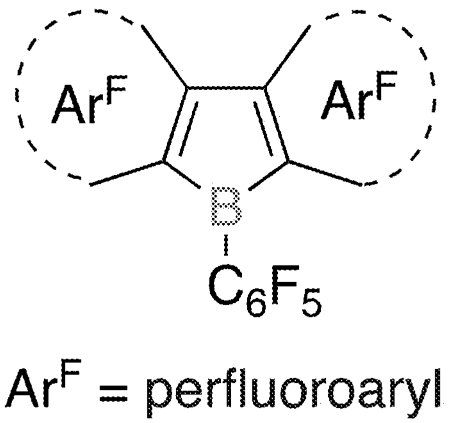
FIG. 2d
$BOR^{F}_{3}$
FIG. 2e

METHOD FOR THE SYNTHESIS OF TRIS(ORTHO-CARBORANYL)BORANE

This application is based upon and claims priority from U.S. Provisional application Ser. No. 63/390,126, entitled "A Method for the Synthesis of Tris(ortho-carboranyl)borane," and filed Jul. 18, 2022 which is incorporated herein by reference.

STATEMENT REGARDING FEDERALLY SPONSORED RESEARCH OR DEVELOPMENT

This invention was made with government support under 2414550, and CHE1753025 awarded by the National Science Foundation. The government has certain rights in the invention.

BACKGROUND OF THE INVENTION

Field of the Invention

Applicants' invention relates to a method for synthesizing tris(ortho-carborane)borane ($BoCb_3$). Applicants' invention further relates to the resulting compound, tris(ortho-carborane)borane, which is an isolable, halide-free, single site, Lewis superacid.

Background Information

Tris(pentafluorophenyl)borane ("BCF") (see FIG. 2*a*, $B(C_6F_5)_3$) was first reported in 1963. BCF and similar halide substituted Lewis acidic boranes (see FIGS. 2*b*, 2*c* [$B(p\text{-}CF_3\text{-}C_6F_4)_3$], 2*d* [$Ar^F$=perfluoroaryl], and 2*e* [$R^F$=$CF_3TeF_3$, $SO_2CF_3$]) are strong Lewis acids for promoting reactions.

A Lewis acid is a substance, such as an $H^+$ ion, that can accept a pair of nonbonding electrons, thus a Lewis acid is an electron-pair acceptor. Because it is a strong Lewis acid, it can be a co-catalyst for $CH_3^-$ and $H^-$ abstraction, where abstraction is a chemical reaction in which there is the bimolecular removal of an atom from a molecular entity. $CH_3^-$ requires a strong Lewis acid to be abstracted.

As a reagent, BCF can cause carbon-carbon bond formation. It can catalyze hydrogenation. It can cause a carbon ring to be opened or formed. It can cause bonds to be formed between a carbon molecule and another molecule.

Although BCF is a useful Lewis acid, it is not more Lewis acidic than the Lewis superacid, $SbF_5$.

There are several boron based Lewis superacids that are known. Most of the methods to obtain them involve the slightest structural modifications of the BCF core, revolving around the fluorinated substituents. For instance, F atoms in BCF are replaced with $CF_3$, ammonium cations, or the fluorinated benzene core has been replaced with fluorinated naphthalene. Among many variants with differing fluoride substitution have been prepared but the only aryl substituted Lewis superacidic borane is $B(p\text{-}CF_3\text{—}C_6F_4)_3$ (see FIG. 2*c*). Strong Lewis acidity has been achieved using rigid pyramidalized boranes tethered with carbon, phosphonium and sulfonium centers, although the free boranes are not isolable species and only found as a transient species or in solutions.

Boranes are useful Lewis acids in stoichiometric and catalytic reactions by taking advantage of the vacant p-orbital. Commonly found boron trihalides ($BX_3$; X=F, Cl, Br) are example of this class; however, their volatile nature and the fragile B—X bonds make them incompatible with many substrates, thus limits its application. In this regard, the analogous tris(pentafluorophenyl)borane [$B(C_6F_5)_3$] commonly known as BCF (FIG. 1), became the standout borane with excellent thermal stability and water and oxygen tolerant without compromising it's Lewis acidity, which eventually established itself as a unique and powerful alternative and earned a recognized position in the borane-based Lewis acid catalysis.

Synthesis of tris(pentafluorophenyl)borane is a one-step process from commercially available reagents. It would be advantageous to increase the yield of the synthesis of tris(pentafluorophenyl)borane, which decreases costs as well as decreasing solvent and reagent waste.

SUMMARY OF THE INVENTION

The present invention provides a novel process that will synthesize tris(ortho-carborane)borane ($BoCb_3$).

$BoCb_3$ is an isolable, halide-free, single site, Lewis superacid. The present invention involves the use of $BoCb_3$ in promoting catalytic reactions. The compound, $BoCb_3$, is disclosed for the first time. $BoCb_3$ is a stronger Lewis acid than other stable boranes.

Traditionally, the three-coordinate boron motifs ($BR_3$, R=aryl, alkyl, vinyl) are synthesized by reacting the corresponding organo-metal species (R-M, M=metal) with boron trihalides ($BX_3$, X=Cl, Br). The lithiation of ortho-carborane with nBuLi and the subsequent reaction with 0.33 equivalents of $BCl_3$ (1 M solution in hexanes) generates the desired $BoCb_3$ generally 29% yield. Generally, "lithiation" involves a reaction with lithium or a lithium compound. Organolithium reagents are chemical compounds that contain carbon-lithium (C—Li) bonds. These reagents are frequently used to transfer the organic group or the lithium atom to a substrate. In this process, a boron trihalide is used for lithiating the ortho-carborane. When more electrophilic $BBr_3$ is used instead of $BCl_3$, the lithiated ortho-carborane produced a corresponding $BoCb_3$ that achieved generally 35% isolated yields.

The geometry of $BoCb_3$ is trigonal planar as all C—B—C bond angles are approximately 120° and the C—B bond lengths [1.614(8)-1.627(7) Å)] are slightly higher than the typical C(o-carborane)-B single bond in boranes species [1.58 Å].

The downfield $^{11}B\{^1H\}$ resonance at 67.2 ppm is assigned to the central boron atom and peaks ranging from 7.4 to −12.4 ppm to the cluster atoms. The C—H protons are the most diagnostic in the $^1H$ NMR spectrum and appear as a singlet at 5.02 ppm while the corresponding carbon is observed in the $^{13}C\{^1H\}$ NMR spectrum at 65.0 ppm and a broad peak at 69.3 ppm is assigned to the ortho-carbons. The melting point is above 250° C. which indicates its thermal stability. $BoCb_3$ is inert to oxygen. $BoCb_3$ reacts slowly with water to give the free carborane and $HOBoCb_2$.

It is also anticipated that $BoCb_3$ would be useful as an olefin polymerization co-catalyst or activator. $BoCb_3$ may also be useful as a Lewis acid catalyst for bond activation reactions to access useful chemicals from abundant feedstocks.

BRIEF DESCRIPTION OF THE DRAWINGS

FIGS. 2*a*-2*e* illustrates various, conventional forms of Lewis acids.

DETAILED DESCRIPTION OF THE PREFERRED EMBODIMENT

| Ref. | Element |
|---|---|
| 10 | Tris(ortho-carborane)borane ($BoCb_3$) |
| 12 | Ortho-Carborane ($oC_2B_{10}H_{12}$) |
| 14 | Primary Carbon C(1) |
| 16 | Substituent Carbon C(1)' |
| 18 | Primary Carbon C(2) |
| 20 | Substituent Carbon C(2)' |
| 22 | Primary Carbon C(3) |
| 24 | Substituent Carbon C(3)' |
| 26 | Central Boron Atom |
| 28 | Boron Atom |
| 30 | Bond |

Figure 1:
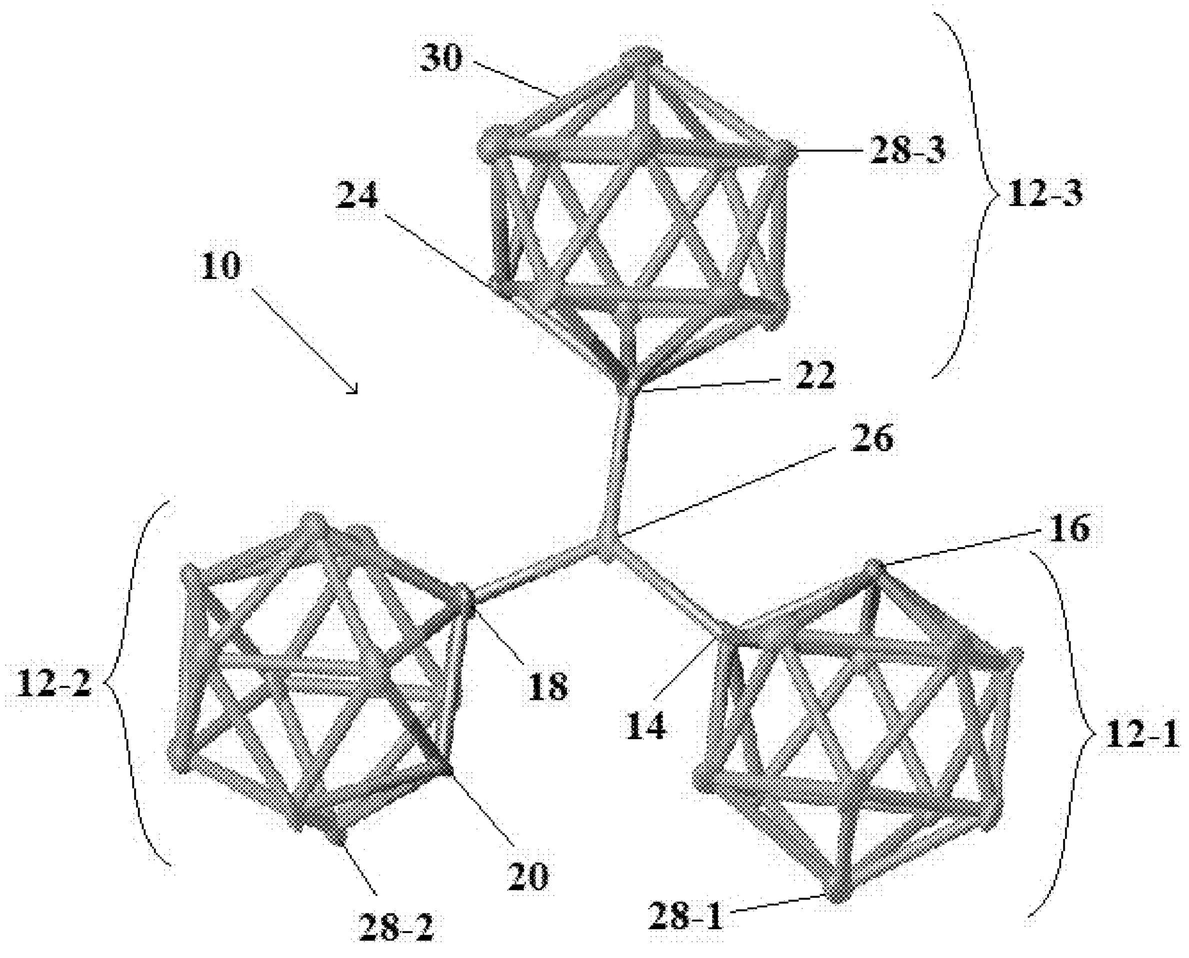
FIG. 1 illustrates the structure of $BoCb_3$.
Figure 2A:
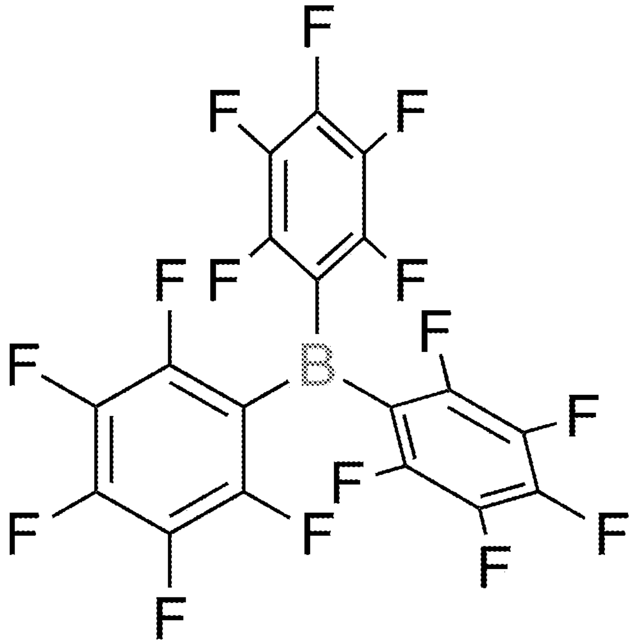
Figure 2B:
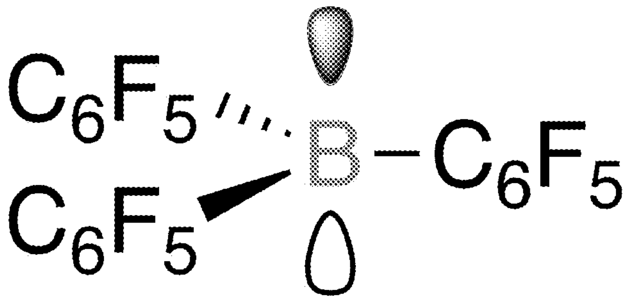

Referring to the figures, FIG. 1 illustrates the solid state structure of tris(ortho-carborane)borane ($BoCb_3$) 10, which is the compound that is the product of the described method of synthesis.

The ortho-carborane 12 has a chemical formula of $oC_2B_{10}H_{12}$. As shown in FIG. 1, the ortho-carborane structure 12 is generally a icosahedron (or 20-sided polyhedron) shaped structure, with the two (2) carbon molecules (14/16, 18/20, or 22/24) and the ten (10) boron atoms 28 at the vertices. In the figure, the hydrogen atoms (not shown) are omitted for clarity. The bonds 30 are represented by the lines between the vertices.

Each molecule of $BoCb_3$ 10 has three (3) ortho-carborane structures 12. The ortho-carborane ($oC_2B_{10}H_{12}$) 12 is abbreviated as oCb 12. Thus, the three (3) ortho-carboranes 12 are designated as the $oCb_3$ portion in the $BoCb_3$.

The $BoCb_3$ 10 molecule is trigonal planar in shape or geometry. Trigonal refers to a geometrical arrangement of molecules having three branches connected to a central atom. Trigonal planar refers to the geometry where the three branches and the central atom are in the same general plane, as illustrated in FIG. 1. In $BoCb_3$, the borane (B) 26 is the central atom, and the three (3) ortho-carboranes ($oCb_3$) 12 are at the ends of the three (3) branches in the trigonal geometry.

One (1) of the primary carbon molecules (C(1) 14, C(2) 18, and C(3) 22) are bound to the central Boron atom 26, one in each of the three (3) ortho-carborane structures 12. The other substituent carbon molecules (16, 20, 24) are located in each of the three (3) ortho-carborane structures 12, and are bound in the ortho-carborane structure 12 at a vertex adjacent to that ortho-carborane structure's 12 primary carbon molecules (14, 18, 22), which are, in turn, bound to the central Boron atom 26. The ortho (o) describes a molecule with substituents at adjacent positions in the structure, thus the ortho-carborane structures 12 have, for example, substituent carbon C(1)' 16 adjacent or next to the primary carbon C(1) 14 on the icosahedron. The primary carbon C(1) 14 is bound to the central Boron (B) atom 26, carbon C(1)' 16, and four (4) Boron atoms 28 in the ortho-carborane structure 12.

In the nitrile and isonitrile adducts, the CN bond lengths range from 1.1380 to 1.1448 Å, respectively. The FT-IR spectra showed the CN stretching frequency of $CH_3CN{\cdot}BoCb_3$ (2363 $cm^{-1}$) is blue shifted in comparison to the $(C_6F_5)_3B{\cdot}NCCH_3$ (2341 $cm^{-1}$). Both metrics indicate a stronger CN bond upon coordination to $BoCb_3$ 10 which signifies stronger coordination and a stronger Lewis acid.

In regard to the benzaldehyde adduct, the CO bond is 1.254 Å, and has a CO stretching frequency of $PhC(H)O{\cdot}BoCb_3$ (1584/1561 $cm^{-1}$) is blue shifted from $PhC(O)H{\cdot}B(C_6F_5)_3$ [1602 $cm^{-1}$] which match the other results. In the $^{11}B$ NMR spectra, the peak for the central boron atom (67.2 ppm) shifts to the tetracoordinate region among the cluster boron peaks. In the $^1H$ NMR spectra, the C—H resonance of $BoCb_3$ (5.02 ppm) in the $^1H$ NMR spectrum shifts up-field to 4.60, 4.77, and 4.72 ppm for $CH_3CN{\cdot}BoCb_3$, $PhC(O)H{\cdot}BoCb_3$, and $2,6\text{-}(CH_3)_2C_6H_3NC{\cdot}BoCb_3$, respectively.

The Gutmann-Beckett method was applied to evaluate the Lewis acidity of $BoCb_3$ 10. The $\Delta\delta$ $^{31}P$ value of $BoCb_3$ 10 is 31.9 ppm that is higher than the reported Lewis superacid $B(p\text{-}CF_3\text{-}C_6F_4)_3$, indicating $BoCb_3$ 10 to be the stronger Lewis acid.

The very high experimental and theoretical Lewis acidity of $BoCb_3$ 10 indicates its potential as a catalyst in C—F bond activation reactions. There are only a few catalytic activities known with the boranes to activate the B—F bonds. It is noted that silanes do not seem to react with $BoCb_3$ 10 to form $HBoCb_2$ or other unwanted side products. When 1 equivalent 1-fluoroadamantane is treated with 1 equivalent $HSiEt_3$ in presence of 1 mol % $BoCb_3$ in $CDCl_3$ at room temperature for 10 minutes, it results in the reduction product adamantane in quantitative yield (89% isolated yield) along with $FSiEt_3$ as side product.

When 1-fluoroadamantane is reacted with benzene in the presence of 5 mol % $BoCb_3$, it resulted in the coupled product in 90% yield within 10 minutes. Lowering the catalyst loading to 1% does not affect the reaction outcome. Additionally, when $B(C_6F_5)_3$ and $H_2O{\cdot}B(C_6F_5)_3$ are subjected to the same transformation, there is no, or negligible, product formation. However, increasing the catalyst loading of $B(C_6F_5)_3$ and $H_2O{\cdot}B(C_6F_5)_3$ to 5 mol % resulted in the desired product in 14% yields.

FIGS. 2*a*-2*e* illustrates various, conventional forms of Lewis acids.

Figure 3:
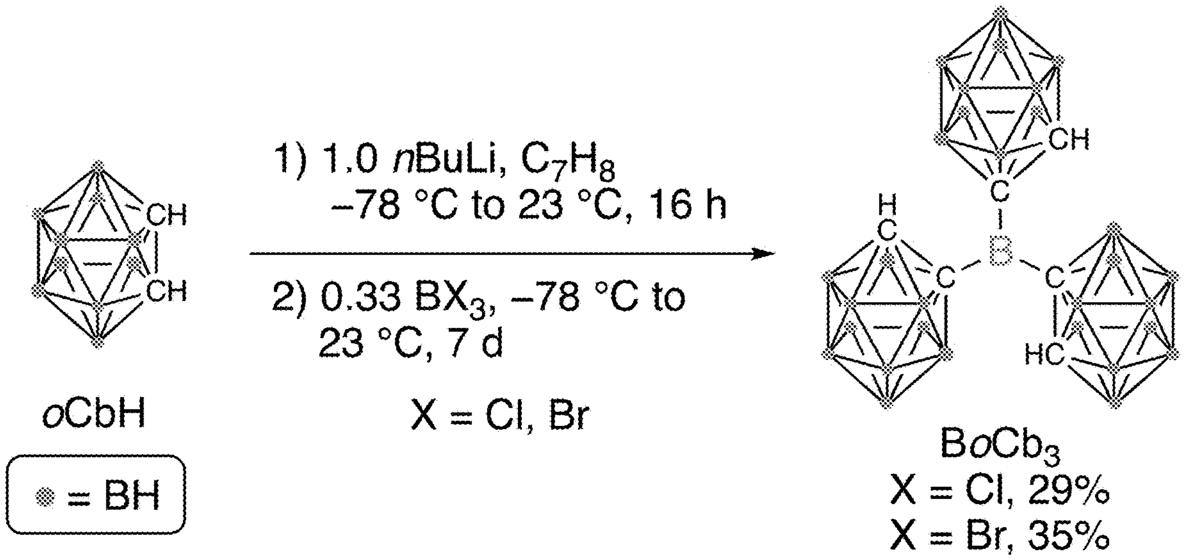
FIG. 3 illustrates the synthesis of $BoCb_3$.

FIG. 3 illustrates the synthesis of $BoCb_3$ 10. Using an unconventional withdrawing group with significant steric protection results in the isolation of a new class of trigonal planar Lewis acids. Conventionally, carboranes offer both of these attributes. A Lewis acid, from the MO theory (MO theory is a theory designed to explain covalent bonding.) perspective, is a molecule that has a non-bonding lowest unoccupied molecular orbital ("LUMO"). The orbital needs to unoccupied, otherwise no electrons could be donated into it. For energy minimization arguments, electrons would be donated into the unoccupied orbital that has the lowest energy, which is the LUMO.

The steps of the method for synthesizing a volume of $BoCb_3$ 10 comprise starting with oCbH and treating it with 1.0 equivalent of nBuLi, $C_7H_8$ at a temperature range of −78° C. to 23° C. for 10 hours or more, or a range of 10 hours to 24 hours, or in a preferred embodiment for generally 16 hours. The resultant is treated with 0.33 mol equivalent $BX_3$ (where X is Cl or Br) at a temperature range of −78° C. to 23° C., or 0° C. to 23° C., for 4 days or more, or in a preferred embodiment for generally 7 days. The final product is $BoCb_3$. When $BCl_3$ is used, the isolated yield of $BoCb_3$ is generally 29%. When more electrophilic $BBr_3$ is used instead of $BCl_3$, the isolated yield of $BoCb_3$ is generally 35%.

In contrast to fluoroaryl boranes, the carborane cluster is not expected delocalize the LUMO, primarily a p-orbital on boron. The icosahedral $C_2B_{10}$ cluster is exceptionally stable and can act as a sigma withdrawing group if C-bound. The three-dimensional icosahedron presents a sphere-like steric profile to protect its center. Within the $C_2B_{10}$ carboranes, three isomers exist with each classified based on the relative positioning of the carbon atoms, ortho (adjacent), meta (one boron between), and para in which the carbon atoms are on opposite sides of the icosahedron. Among these, the ortho isomer is the most electron withdrawing.

Figure 4:
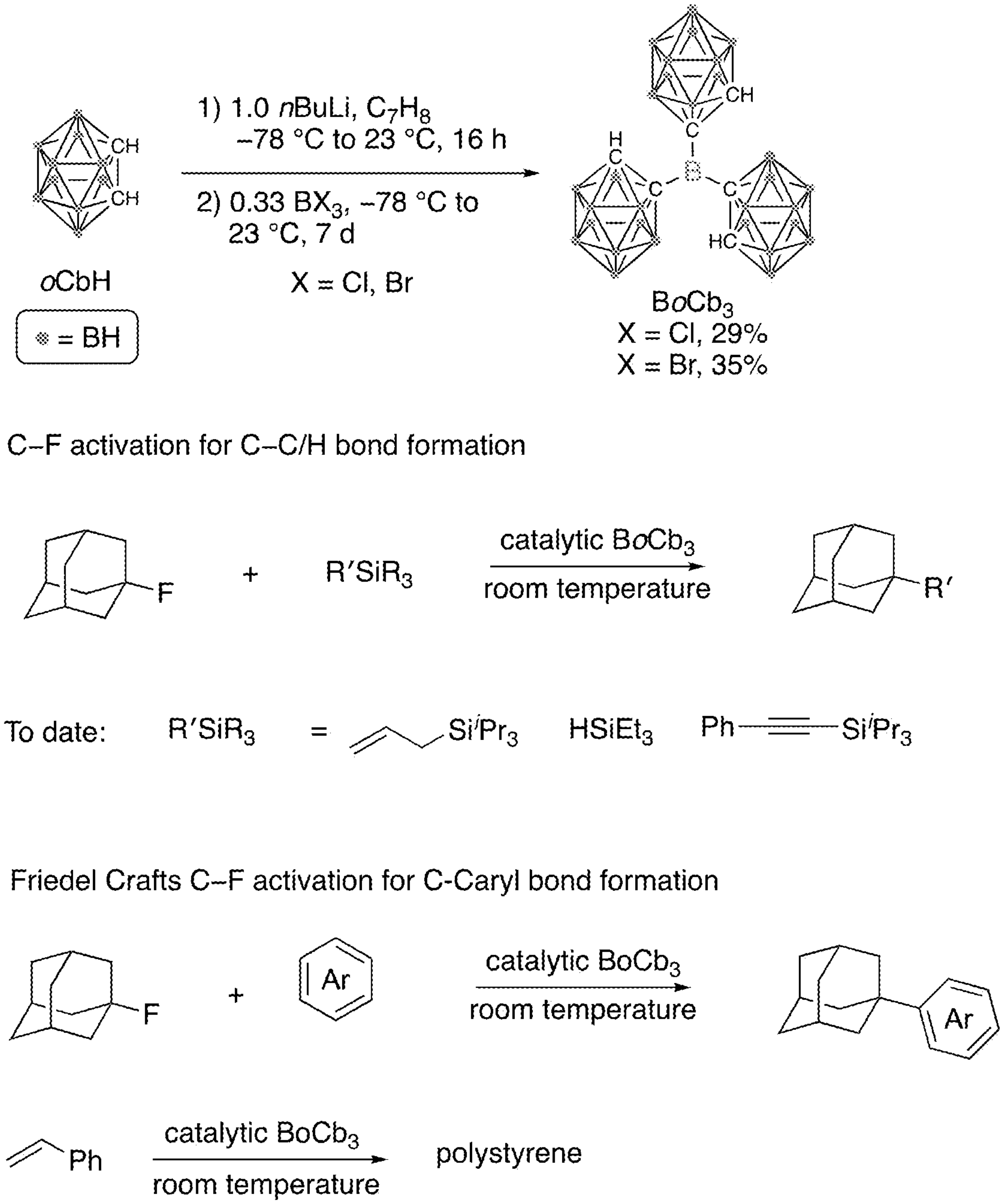
FIG. 4 is an expanded illustration of the synthesis of $BoCb_3$.

FIG. 4 is an expanded illustration of the synthesis of $BoCb_3$ 10.

To a stirred toluene (20 mL) solution of o-carborane (10.00 mol, 1.442 g) in a container such as a Schlenk flask at −78 0° C., nBuLi (10.00 mmol, 4.00 mL) is slowly added under nitrogen. After stirring the reaction mixture for an additional 16 hours at room temperature, $BBr_3$ (3.333 mmol, 316.3 μL) in toluene (10 mL) is slowly added via a syringe at approximately −78° C., accomplished over a period of approximately 10 minutes. The reaction mixture is stirred for 4 days or more, or preferably approximately 7 days at room temperature.

After confirming completion of the reaction (monitored by $^1H$ and $^{11}B$ NMR spectroscopy), an additional 50 mL of toluene is added and the mixture filtered through a small pad of celite, which is washed with dichloromethane (3×10 mL). The solids are then removed from the combined filtrate under vacuum and 10 mL of diethyl ether is added to the solids to form a suspension, which is filtered through a glass frit and the white residue is washed with diethyl ether (2×5 mL).

The residue is dried under vacuum to get pure $BoCb_3$ 10 as a white solid. Single crystals for X-ray diffraction studies are grown from a 1:1 dichloromethane/chloroform solution of $BoCb_3$ 10 by vapor diffusion into toluene.

Yield: 35%, 511 mg; mp: >260° C.; $^1H$ NMR (400 MHz, $CDCl_3$): δ=5.02 (s, 3H), 1.11-3.78 (m, 33H) ppm; $^{13}C\{^1H\}$ NMR (101 MHz, $CDCl_3$): δ=69.3, 65.0 ppm; $^{13}C$ NMR (101 MHz, $CDCl_3$): δ=69.2, 65.0 (d, J=190.0 Hz) ppm; ii B $\{^1H\}$ NMR (128 MHz, $CDCl_3$): δ=66.9 (s), 7.4 (s), −2.7 (s), −6.2 (s), −8.7 (s), −12.4 (s) ppm; $^{11}B$ NMR: 6=66.9 (s), 7.4 (d, J=148.6 Hz), −2.7 (d, J=152.4 Hz), −6.2 (d, J=153.0 Hz), −8.6 (d, J=156.5 Hz), −12.4 (d, J=123.8 Hz) ppm; FT-IR (ranked intensity, $cm^{-1}$): 3148 (4), 2575 (1), 1191 (12), 1105 (2), 1061 (6), 1031 (15), 982 (11), 936 (7), 788 (5), 726 (3), 696 (14), 663 (9), 594 (8), 516 (10), 465 (13); HRMS(-ESI): calcd 441.5762 for $C_6H_{34}B_{31}$ $[M+H]^-$ found 441.5769; Elemental analysis: calcd C16.36, H7.55 for $C_6H_{33}B_{31}$; found: C16.17, H7.71.

Unless otherwise specifically noted, the elements and articles depicted in the drawings are not necessarily drawn to scale, but they are illustrative of the described implementations and are intended to disclose the elements and articles illustrated as part of the specification, and the drawings further indicate relative size, angles, shapes, arrangement, placement, and like information to one of ordinary skill in the art regarding the elements and articles in the drawing.

Throughout this disclosure, a hyphenated form of a reference numeral refers to a specific instance of an element and the un-hyphenated form of the reference numeral refers to the element generically or collectively. Thus, for example, widget 12-1 would refer to a specific widget of a widget class 12, while the class of widgets may be referred to collectively as widgets 12 and any one of which may be referred to generically as a widget 12.

As used herein, "removably attached," "removably attachable," or "removable" mean that a first object that is coupled to a second object may be decoupled from the second object, or taken away from an attached position relative to the second object, using some force or movement. "Removably attached," "removably attachable," or "removable" further mean that if the first object is not coupled with the second object, the first object may be coupled to the second object or returned to the attached position, using some force or movement. Both the decoupling and the coupling may be accomplished without damaging either the first object or the second object.

When the terms "substantially," "approximately," "about," or "generally" are used herein to modify a numeric value, range of numeric values, or list numeric values, the term modifies each of the numerals. Unless otherwise indicated, all numbers expressing quantities, units, percentages, and the like used in the present specification and associated claims are to be understood as being modified in all instances by the terms "approximately," "about," and "generally." As used herein, the term "approximately" encompasses +/−5 of each numerical value. For example, if the numerical value is "approximately 80," then it can be 80+/−5, equivalent to 75 to 85. As used herein, the term "about" encompasses +/−10 of each numerical value. For example, if the numerical value is "about 80," then it can be 80+/−10, equivalent to 70 to 90. As used herein, the term "generally" encompasses +/−15 of each numerical value. For example, if the numerical value is "about 80," then it can be 80%+/−15, equivalent to 65 to 95. Accordingly, unless indicated to the contrary, the numerical parameters (regardless of the units) set forth in the following specification and attached claims are approximations that may vary depending upon the desired properties sought to be obtained by the exemplary embodiments described herein. In some ranges, it is possible that some of the lower limits (as modified) may be greater than some of the upper limits (as modified), but one skilled in the art will recognize that the selected subset will require the selection of an upper limit in excess of the selected lower limit.

At the very least, and not limiting the application of the doctrine of equivalents to the scope of the claim, each numerical parameter should at least be construed in light of the number of reported significant digits and by applying ordinary rounding techniques.

The terms "inhibiting" or "reducing" or any variation of these terms refer to any measurable decrease, or complete inhibition, of a desired result. The terms "promote" or "increase" or any variation of these terms includes any measurable increase, or completion, of a desired result.

The term "effective," as that term is used in the specification and/or claims, means adequate to accomplish a desired, expected, or intended result.

The terms "a" or "an" when used in conjunction with the term "comprising" in the claims and/or the specification may mean "one," but it is also consistent with the meaning of "one or more," "at least one," and "one or more than one."

The term "each" refers to each member of a set, or each member of a subset of a set.

The terms "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

In interpreting the claims appended hereto, it is not intended that any of the appended claims or claim elements invoke 35 U.S.C. 112(f) unless the words "means for" or "step for" are explicitly used in the particular claim.

It should be understood that, although exemplary embodiments are illustrated in the figures and description, the principles of the present disclosure may be implemented using any number of techniques, whether currently known or not. The present disclosure should in no way be limited to the exemplary implementations and techniques illustrated in the drawings and description herein. Thus, although the invention has been described with reference to specific embodiments, this description is not meant to be construed in a limited sense. Various embodiments may include some, none, or all of the enumerated advantages. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention. Modifications, additions, or omissions may be made to the systems, apparatuses, and methods described herein without departing from the scope of the disclosure. For example, the operations of the systems and apparatuses disclosed herein may be performed by more, fewer, or other components in the methods described may include more, fewer, or other steps. Additionally, steps may be performed in any suitable order.

What is claimed:

1. A chemical compound, comprising:

a Lewis acid having general formula $BoCb_3$, further comprising:

an ortho-carborane structure oCb having general formula $oC_2B_{10}H_{12}$, wherein said Lewis acid comprises three (3) of said ortho-carborane structures $oCb_3$; and a central boron atom B;

wherein said $BoCb_3$ molecule is of trigonal planar geometry with said central boron atom B at the center of said trigonal planar geometry and each of said ortho-carborane structures oCb at a branch of said trigonal planar geometry; and wherein all oCb-B-oCb bond angles are approximately 120°.

2. The chemical compound of claim 1, wherein said Lewis acid is isolable and halide-free.

3. The chemical compound of claim 1, wherein all B-oCb bond lengths are in a range of 1.614(8) Å to 1.627(7) Å.

4. The chemical compound of claim 1, wherein the melting point of said Lewis acid is 250° C. or higher.

5. The chemical compound of claim 1, wherein said Lewis acid is inert to oxygen.

6. The chemical compound of claim 1, wherein said Lewis acid reacts with water to generate free carborane and HOB-$oCb_2$.

7. The process of synthesizing tris(ortho-carborane)borane ($BoCb_3$), comprising:

first treating oCbH with 1.0 equivalent of nBuLi, $C_7H_8$, wherein the temperature is in a range of −78° C. to 23° C., and wherein said first treating step is continued for 10 hours or more to obtain a resultant; and second treating said resultant with 0.33 mol equivalent $BX_3$, wherein X is Cl or Br, wherein the temperature range is in a range of −78° C. to 23° C., and wherein said second treating step is continued for 4 days or more.

8. The process of claim 7, wherein said first treating step is continued for a range of 10 hours to 24 hours.

9. The process of claim 7, wherein said first treating step is continued for generally 16 hours.

10. The process of claim 7, wherein said second treating step is continued for generally 7 days.

11. The process of claim 7, wherein said $BX_3$ is chosen from one of $BCl_3$ or $BBr_3$.

12. The process of claim 7, further comprising:

stirring a solution of toluene and o-carborane in a container;

first adding said nBuLi under nitrogen to said toluene and said o-carborane, wherein the temperature is in a range of −78° C. to 23° C., to create a first mixture;

first stirring said first mixture after said first treating step at room temperature for 10 hours or more to obtain said resultant;

second adding $BBr_3$ in toluene to said resultant at approximately −78° C. to create a second mixture; and second stirring said second mixture after said second treating step at room temperature for 4 days or more.

13. The process of claim 12, wherein said second adding step is accomplished over a period of approximately 10 minutes.

14. The process of claim 12, further comprising:

third adding toluene to said second mixture, wherein said third adding step is completed after said second stirring step is completed, to create a filtrate and solids in said filtrate;

removing said solids from said filtrate;

adding diethyl ether to said solids to form a suspension;

filtering said suspension through a glass frit to obtain a white residue;

washing said white residue with diethyl ether; and drying said white residue under vacuum to obtain $BoCb_3$.

15. A method of promoting catalytic reactions, comprising adding tris(ortho-carborane)borane ($BoCb_3$) to a reaction, wherein said reaction is one (1) of olefin polymerization or bond activation reactions to access useful chemicals from abundant feedstocks.

* * * * *